United States Patent
Ramne

(10) Patent No.: US 6,354,448 B1
(45) Date of Patent: Mar. 12, 2002

(54) TELESCOPIC DEVICE AT A TRAIN SYSTEM

(76) Inventor: Bengt Ramne, 14, Amy La., Malvern, PA (US) 19355

( * ) Notice: Subject to any disclaimer, the term of this patent is extended or adjusted under 35 U.S.C. 154(b) by 0 days.

(21) Appl. No.: 09/601,049

(22) PCT Filed: Jan. 27, 1999

(86) PCT No.: PCT/SE99/00109
§ 371 Date: Jul. 25, 2000
§ 102(e) Date: Jul. 25, 2000

(87) PCT Pub. No.: WO99/38750
PCT Pub. Date: Aug. 5, 1999

(30) Foreign Application Priority Data

Jan. 28, 1998 (SE) .............................................. 9800239

(51) Int. Cl.⁷ .................................................. B61G 1/02
(52) U.S. Cl. ..................... 213/75 TC; 105/1.4; 213/69; 213/71; 213/72
(58) Field of Search .............................. 105/1.4, 3, 8.1, 105/458; 213/62 R, 63, 66, 69, 75 TC, 71, 72; 280/492, 493, 491.2, 491.3, 479.1

(56) References Cited

U.S. PATENT DOCUMENTS

| | | | |
|---|---|---|---|
| 3,800,733 A | * | 4/1974 | West ...................... 114/235 A |
| 4,591,181 A | * | 5/1986 | Gutschmidt ............. 280/476 R |
| 5,338,050 A | | 8/1994 | Haire et al. .............. 280/476.1 |

FOREIGN PATENT DOCUMENTS

| | | | | |
|---|---|---|---|---|
| CH | 614164 A | | 11/1979 | |
| DE | 4142485 | | 7/1993 | ............ B06D/1/42 |
| DE | 4142485 A1 | * | 7/1993 | |
| SE | 467247 B | | 6/1992 | |
| SE | 505098 C | | 4/1993 | |
| SE | 505098 | * | 6/1997 | |

* cited by examiner

Primary Examiner—S. Joseph Morano
Assistant Examiner—Frantz F. Jules
(74) Attorney, Agent, or Firm—Orum & Roth

(57) ABSTRACT

The invention relates to an arrangement for a train system consisting of vehicles capable of connection in a row, which exhibit lifting devices to permit them to be lifted between a lowered position enabling them to be driven under loading cassettes functioning as load carriers and a raised position enabling the vehicles to be driven on a base with the load supported between designated loading locations on land or on a ship, in conjunction with which connecting devices are so arranged as to connect the vehicles together with one another in pairs. The aforementioned connecting devices are formed by telescopic bars, which are supported in such a way as to be capable of pivoting both vertically and horizontally.

13 Claims, 5 Drawing Sheets

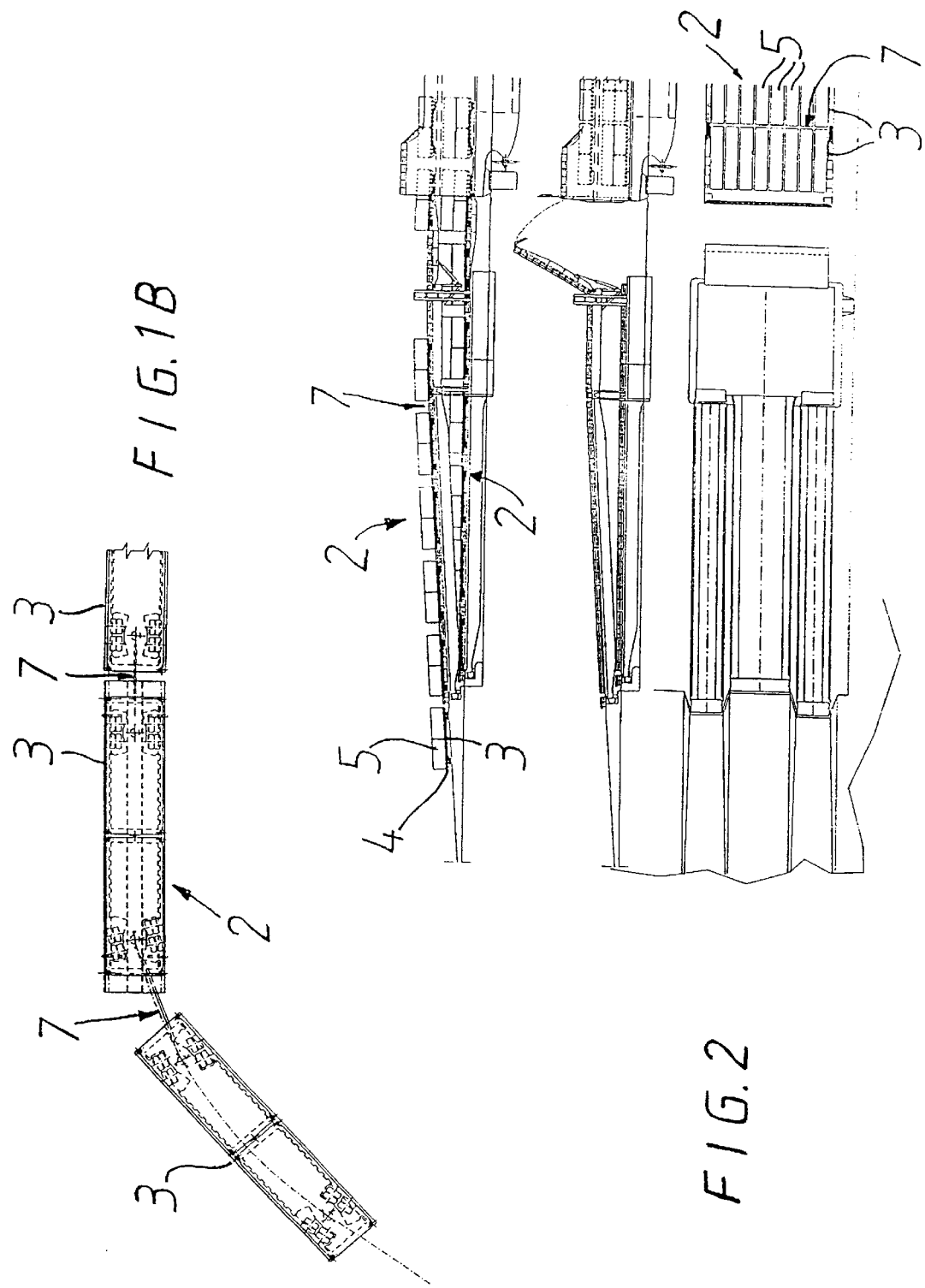

TELESCOPIC DEVICE AT A TRAIN SYSTEM

BACKGROUND OF THE INVENTION

The present invention relates to an arrangement for a train system consisting of vehicles capable of connection in a row, which exhibit lifting devices to permit them to be lifted between a lowered position enabling them to be driven under loading cassettes functioning as load carriers and a raised position enabling the vehicles to be driven on a base with the load supported between designated loading locations on land or on a ship, in conjunction with which connecting devices are so arranged as to connect the vehicles together with one another in pairs.

Load cassettes with the ability to support the desired load, as the need arises, are so arranged as to be transported between load storage locations on land and on board vessels with the help of vehicles exhibiting drive devices enabling them to be driven between desired locations with the load. For this purpose, the vehicles are connected together with rigid couplings, which means that the distance between the vehicles, and thus between the load cassettes and the load supported thereon, is considerable and of no benefit when the cassettes are lowered at the designated storage locations on board ships or in storage areas. It is, of course, necessary to have a certain distance between the vehicles, viewed in the longitudinal sense, in order for them to be capable of turning when they are being transported on land without making contact with one another at their corners, as they would otherwise have to exhibit a completely rounded rear and front part.

The principal object of the present invention is thus, in the first instance, to solve the aforementioned problems efficiently and safely by simple means.

SUMMARY OF THE INVENTION

The aforementioned object is achieved by means of an arrangement in accordance with the present invention, which is characterized essentially in that the aforementioned connecting devices are formed from telescopic bars that are pivotally mounted both vertically and horizontally, so that a certain distance is provided between the vehicles, viewed in the longitudinal sense, when the telescopic bars are in their extended position, so that the vehicles, when they are being transported on land, shall be capable of turning without making contact with one another at their corners, and so that a small distance is present between the vehicles, viewed in the longitudinal sense, when the telescopic bars are set to the retracted position, so that the vehicles, when set down at their storage locations, shall be capable of being packed closely together.

BRIEF DESCRIPTION OF DRAWINGS

The invention is described below as a Preferred illustrative embodiment, in conjunction with which reference is made to the accompanying drawings, in which:

FIG. 1B illustrates wagon-connecting devices included in the invention in different positions;

FIG. 2 illustrates a loading and unloading ramp between the land and a ship for a train system in accordance with the invention;

DETAILED DESCRIPTION OF INVENTION

Figure 1:
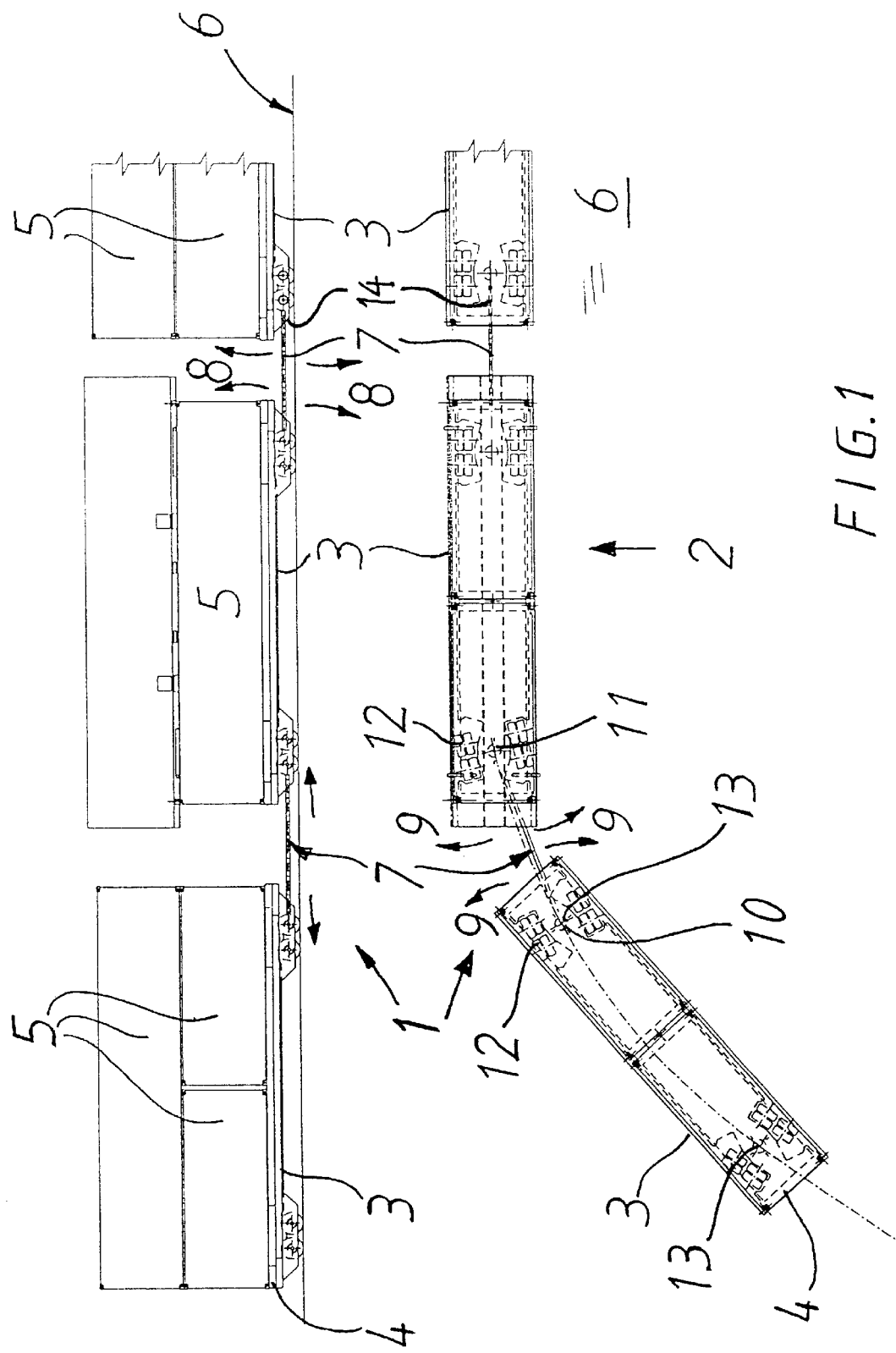
FIG. 1 illustrates the invention schematically in its operating function in a train system, viewed from the side and from above.
Figure 1A:
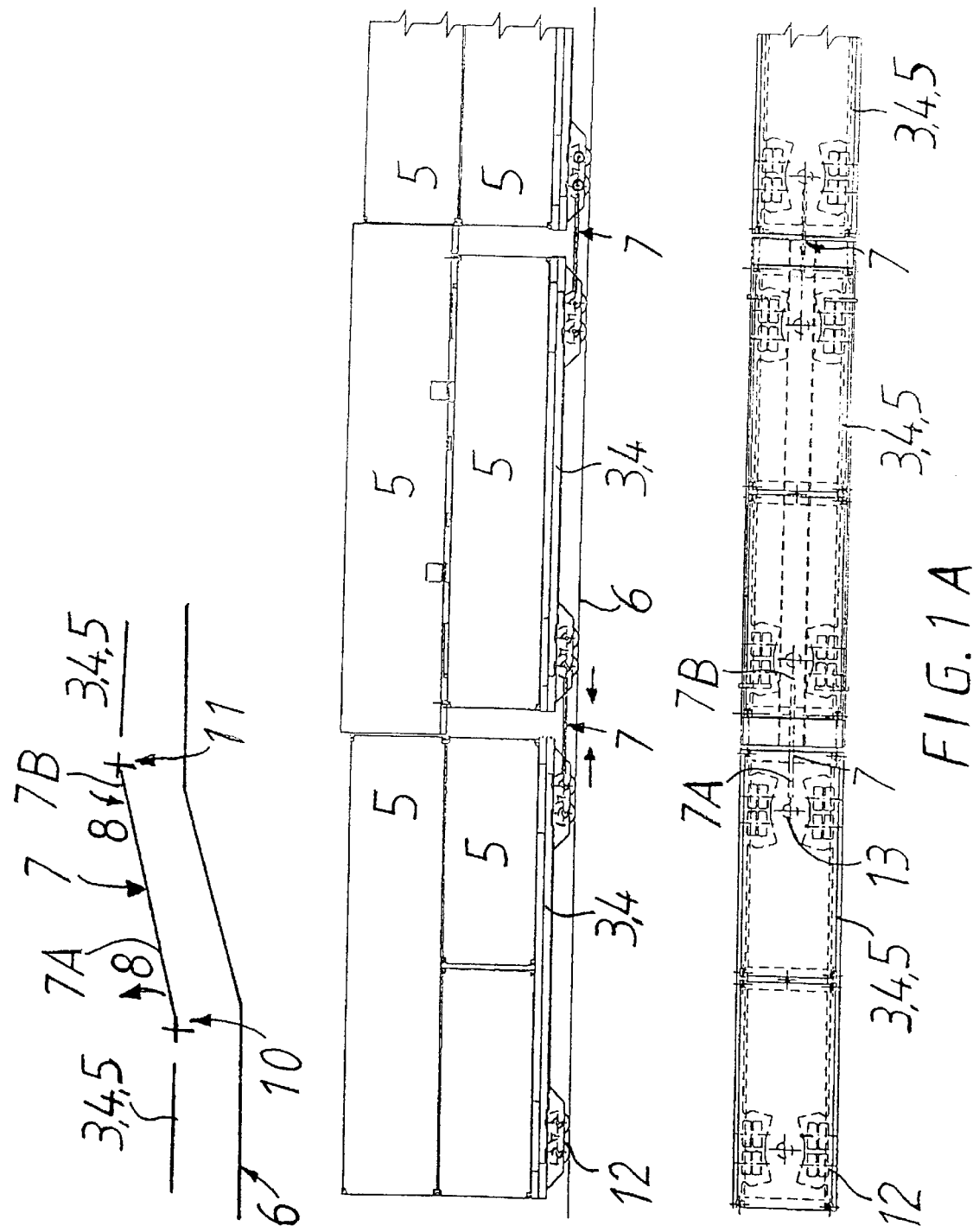
FIG. 1A illustrates the aforementioned train set in the compacted position.
Figure 3:
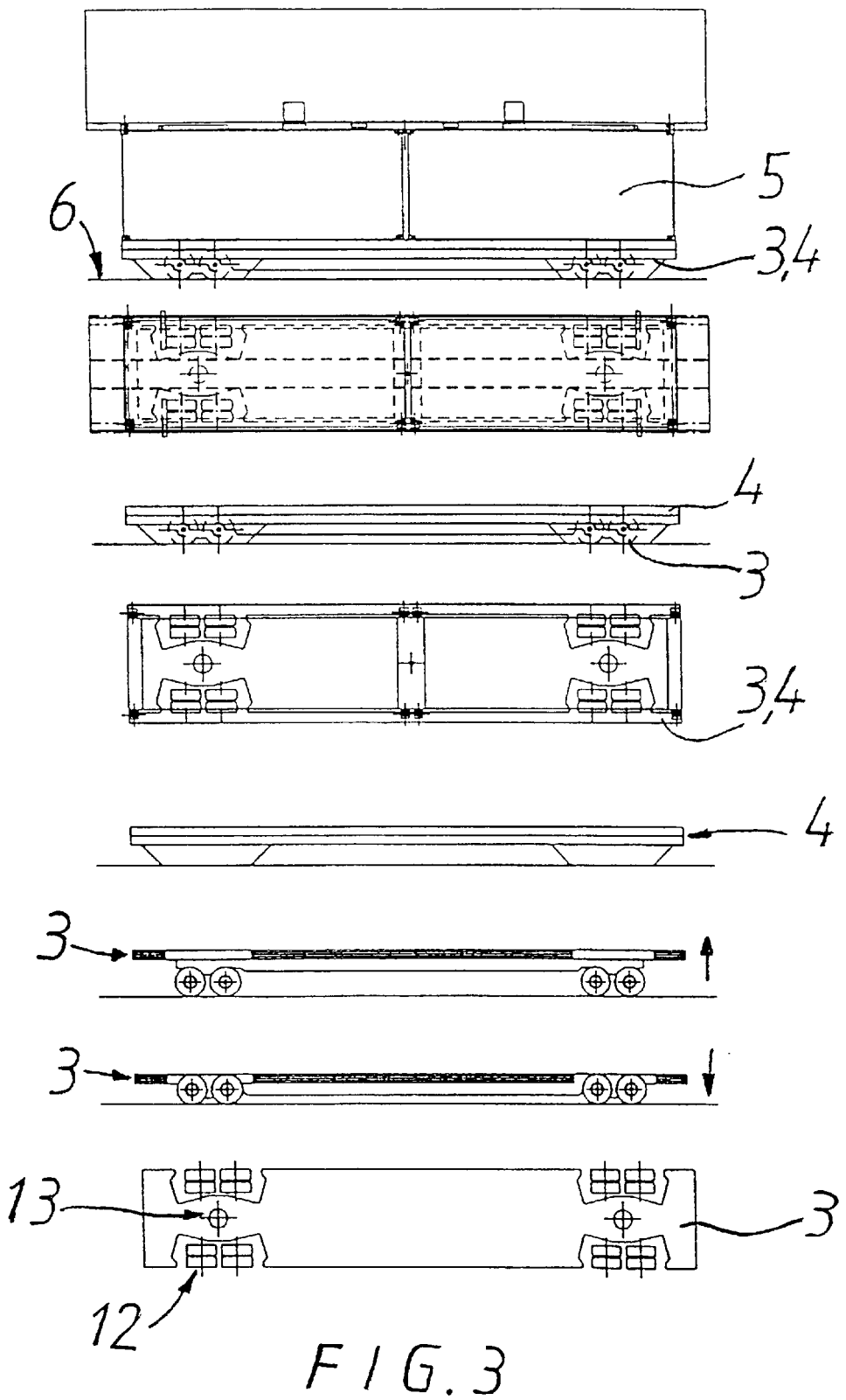
FIG. 3 illustrates a single wagon included in the aforementioned train system and the various component parts included therein.
Figure 4:
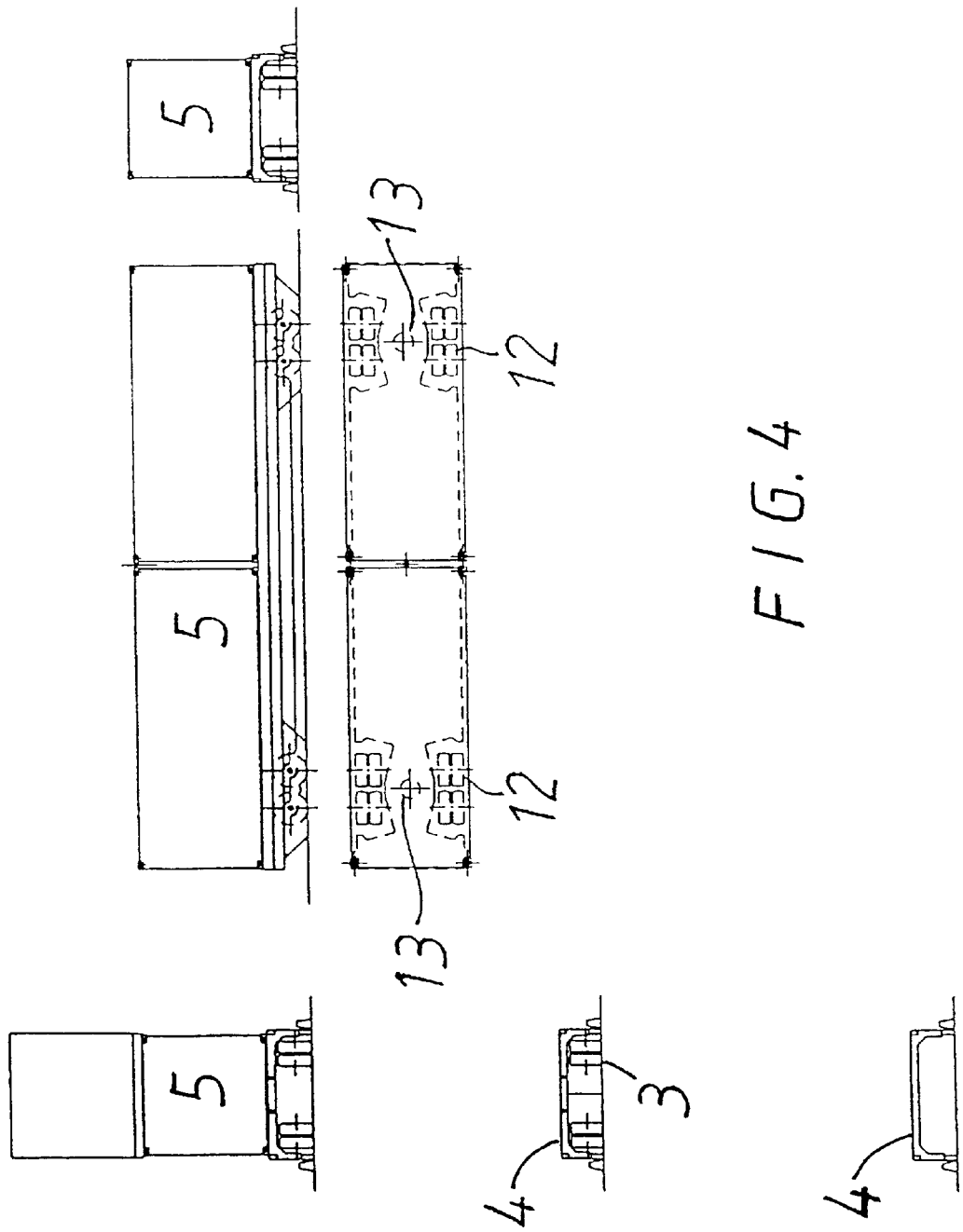
FIG. 4 illustrates further views of a wagon and its associated component parts viewed from different directions and in different positions.

An arrangement 1 for a train system 2 consisting of vehicles 3 capable of connection in a row, which exhibit lifting devices to permit them to be lifted between a lowered position enabling them to be driven under loading cassettes 4 so arranged as to function as load carriers for a load 5 thereon and a raised loading position. In the raised position, the vehicles 3 are so arranged as to be capable of being driven on the ground 6 or some other base with a load 5 supported on a subjacent cassette 4 between designated loading locations on land or on a ship. Connecting devices 7 are so arranged as to connect together the vehicles 3, which are self-propelled or are moved by a common traction vehicle, in pairs with one another. In accordance with the invention, the aforementioned connecting devices are formed by telescopic bars 7, which are supported in such a way as to be capable of pivoting both vertically 8 and horizontally 9 about connecting points 10, 11 on the vehicles 3. The aforementioned telescopic bars 7 are capable of being connected at their respective ends 7A, 7B to a wheel bogie 12 on the respective vehicle 3, which in turn is supported in a pivotally mounted fashion about a vertical bearing shaft 13. In conjunction with this, the telescopic bars 7 are so arranged as to pivot together with the connectable wheel bogies 12 rigidly connected to them in the lateral sense. Each telescopic bar 7 is also detachably attachable to the associated wheel bogie 12, so that it can pivot vertically about it.

The aforementioned telescopic bars 7 can also be driven jointly by a motor, e.g. by means of a fluid or some other appropriate drive means, to vary their effective length as required.

All the telescopic bars 7 can be connected to a common drive arrangement in order to set the telescopic bars 7 to a desired length, and to enable them to be locked so as to retain their set length. Manual length adjustment of the telescopic bars 7 is also possible.

The telescopic bars 7 can also be pivotally mounted in any desired direction at all via ball couplings or other couplings which permit unrestricted pivoting of the telescopic bars 7.

The function and nature of the invention should have emerged from the foregoing, and its unrestricted application should also have been appreciated. The invention is not, however, restricted to what is described and illustrated above, but may be varied within the scope of the patent claims.

What is claimed is:

1. Arrangement for a train system comprising:
    vehicles capable of connection in a row, which exhibit lifting devices to permit the vehicles to be lifted between a lowered position enabling the vehicles to be driven under loading cassettes functioning as load carriers and a raised position enabling the vehicles to be driven on a base with the load supported between designation loading locations on land or on a ship, in conjunction with which connecting devices are so arranged as to connect the vehicles together with one another in pairs, characterized in that the aforementioned connecting devices are formed from telescopic bars that are pivotally mounted both vertically and horizontally, so that a certain distance is provided between the vehicles, viewed in the longitudinal sense, when the telescopic bars are in their extended position, so that the vehicles, when they are being transported on land, shall be capable of turning without making contact with one another at their corners, and so that a small distance is present between the vehicles, viewed in the longitudinal sense, when the telescopic bars are set to the retracted position, so that the vehicles, when set down at their storage locations, shall be capable of being packed closely together, that the telescopic bars are connectable at their respective ends to a wheel bogie on the respective vehicle, which in turn is supported in a pivotally mounted fashion about a vertical bearing shaft, in conjunction with which the telescopic bars pivot together with connectable wheel bogies rigidly connected in the lateral sense, and in that each telescopic bar is also attachable to the wheel bogie, so that the telescopic bar can pivot vertically about the wheel bogie.

2. Arrangement as claimed in Patent claim 1, characterized in that the aforementioned telescopic bars (7) are driven jointly by a motor to vary their effective length.

3. Arrangement as claimed in Patent claim 2, characterized in that all the telescopic bars (7) can be connected to a common drive arrangement in order to set the telescopic bars to the desired length, and to retain their set length.

4. Arrangement as claimed in claim 3, characterized in that the telescopic bars (7) are detachably attachable to the vehicles (3).

5. Arrangement as claimed in claim 3, characterized in that the telescopic bars are pivotally mounted via couplings which permit unrestricted pivoting.

6. Arrangement as claimed in claim 2, characterized in that the telescopic bars (7) are detachably attachable to the vehicles (3).

7. Arrangement as claimed in claim 2, characterized in that the telescopic bars are pivotally mounted via couplings which permit unrestricted pivoting.

8. Arrangement as claimed in Patent claim 1, characterized in that the telescopic bars (7) are manually adjustable to the desired length.

9. Arrangement as claimed in claim 8, characterized in that the telescopic bars (7) are detachably attachable to the vehicles (3).

10. Arrangement as claimed in claim 4, characterized in that the telescopic bars are pivotally mounted via couplings which permit unrestricted pivoting.

11. Arrangement as claimed in claim 1, characterized in that the telescopic bars (7) are detachably attachable to the vehicles (3).

12. Arrangement as claimed in claim 5, characterized in that the telescopic bars are pivotally mounted via couplings which permit unrestricted pivoting.

13. Arrangement as claimed in claim 1, characterized in that the telescopic bars (7) can be pivotally mounted in a desired direction via ball couplings or other couplings which permit unrestricted pivoting in any direction at all.

* * * * *